United States Patent [19]

Kato et al.

[11] 4,053,208
[45] Oct. 11, 1977

[54] REAR PROJECTION SCREENS

[75] Inventors: Hisatoyo Kato; Junji Miyahara, both of Minami-ashigara, Japan

[73] Assignee: Fuji Photo Film Co., Ltd., Minami-ashigara, Japan

[21] Appl. No.: 654,830

[22] Filed: Feb. 3, 1976

[30] Foreign Application Priority Data

Feb. 3, 1975 Japan .................................. 50-14541

[51] Int. Cl.[2] .............................................. G03B 21/56
[52] U.S. Cl. .................................. 350/117; 362/330; 362/355
[58] Field of Search ................ 350/117, 128, 126, 156, 350/276 R; 240/41.4 R, 41.4 D; 178/7.82, 7.85; 313/112

[56] References Cited

U.S. PATENT DOCUMENTS

| | | | |
|---|---|---|---|
| 2,510,344 | 6/1950 | Law | 350/128 |
| 3,330,692 | 7/1967 | Ehrlich | 350/276 R |
| 3,580,661 | 5/1971 | Cooper, Jr. | 350/128 |

*Primary Examiner*—Richard A. Wintercorn
*Attorney, Agent, or Firm*—Sughrue, Rothwell, Mion, Zinn and Macpeak

[57] ABSTRACT

A rear projection screen produced by providing surface irregularity directly on at least one side of a light diffusion layer containing at least one light scattering material selected from the group consisting of one or more waxes, one or more crystalline polymers or a mixture thereof.

21 Claims, 7 Drawing Figures

REAR PROJECTION SCREENS

BACKGROUND OF THE INVENTION

1. Field of the Invention

The present invention relates to a rear projection screen. More particularly, the present invention is concerned with a rear projection screen having an improved surface structure and greatly improved optical properties.

2. Description of the Prior Art

Conventional rear projection screens can be roughly divided into the following four groups:

1. Micro-optical screens, in which an surface irregularity on the order of microns is provided on the surface of a transparent plate.
2. Dispersion screens, in which a light diffusing layer is formed by dispersing light scattering particles in a binder.
3. Wax screens, in which wax in the form of a sheet is used as a light diffusing layer.
4. Crystalline polymer screens, in which a crystalline polymer material in the form of a sheet is used as a light diffusing layer.

In the above micro-optical screen (1), a fine structure, e.g., Fresnel lens, fly's eye lens or a lenticular lens, is formed on the surface of a transparent plate, e.g., a glass plate or an acrylic resin plate, and a redistribution of light projected onto the screen is caused utilizing the refraction and scattering of light at the interface between the air and the transparent plate. A surface-matted screen with random and fine surface irregularity on its surface, e.g., ground glass, falls into this group.

In the dispersion screen (2), a powdered inorganic material such as $SiO_2$, $CaCO_3$, $BaSO_4$, $Al_2O_3$, $ZnO$, $TiO_2$, glass, or the like, or a powdered organic material such as polymer or a latex is dispersed in an organic binder as is generally used in the paint industry and then coated on a transparent support, or is dispersed directly in the transparent support, light being scattered by these dispersed powders.

The wax screen (3) uses a diffusion plate in which a waxy solid such as natural wax, a petroleum wax or a synthetic wax is used as a light scattering material.

The crystalline polymer screen (4) uses a diffusion plate comprising a crystalline polymer, and desired optical properties are obtained by controlling by various methods the spherulite microstructure of the crystalline polymer.

Before discussing the advantages and disadvantages of conventional rear projection screens, characteristic values which are used to evaluate optical properties will be defined. Hitherto, various characteristic values have been proposed to evaluate the optical properties of rear projection screens. In the present invention, however, the optical properties of a rear projection screen will be evaluated by the use of the following four characteristic values.

a. Scintillation

Scintillation is caused by the aggregation of numerous spots of light appearing on a rear projection screen. The spots of light sparkle one by one and it appears as though the aggregation of light spots moves with the a movement of a viewer's eyes. Since scintillation fatigues the eyes of a viewer, it is most desired to reduce the same.

In a micro-optical element, as later described, light coming from each element of the micro-optical element is observed as an aggregation of light spots since they are separatedly and individually visible. While this phenomenon is due to a cause slightly different from that which causes scintillation, in the present invention, however, such light surface irregularity is included in scintillation.

There is no physical means to evaluate scintillation, as will be understood from the definition thereof, that is, scintillation cannot be expressed numerically, and thus scintillation is usually expressed using a trained individual's subjective measurement.

b. Image reproduction range

The image reproduction range is a characteristic value which shows the density range in which an image projected on a rear projection screen is reproducible, and is defined by the following equation:

$$\text{Image Reproduction Range} = \log \left( \frac{\text{Maximum Luminance on Screen}}{\text{Minimum Luminance on Screen}} \right)$$

In this case, the maximum luminance varies not only with the characteristics of the screen itself, but also with the intensity of the projection light used to project an image on the screen, and, thus, strictly speaking, the intensity of the image projection light used should be specified.

On the other hand, the minimum luminance is equal to the luminance due to the reflection of room light on the side of the screen which faces an observer. With any rear projection screen, therefore, if it is used in the dark, the minimum luminance is substantially zero, and its image reproduction range becomes widened.

In general, however, since a rear projection screen is used in room light, a reduction to lower levels of minimum luminance through an increase in room light shielding properties is an important factor in providing a desired rear projection screen.

To increase the image reproduction range, it is required that the rear projection screen have a high diffusion transmittance and a low diffusion reflectance. When the former requirement is met, the maximum luminance on the screen increases, whereas when the latter requirement is met, reflection of room light on the surface of the screen decreases, thereby resulting in a decrease in minimum luminance, and, at the same time, loss at the rear of the screen of the image projection light from the projection light source decreases, thereby resulting in an increase in maximum luminance. Therefore, the image reproduction range as a whole increases.

c. Light redistribution characteristic

This term designates the degree of uniformity with which light is redistributed to the position of the observer (hereinafter referred to as the observation range) when image information is projected onto the screen. This term designates the degree of uniformity with which light is redistributed through a predefined audience space in such manner that its luminance, viewed from any point in the audience space, is substantially constant.

In general, it is desired that image information be distributed only in the observation range, and, furthermore, uniformly on the screen.

The following two characteristic values are used herein to show the above light redistribution characteristic.

The first characteristic value to show the diffusion characteristic of the screen is the scattering angle of scattering light (θ½), i.e. the angle at which the luminance decreases to ½ of that of light emitted vertically from the surface of the screen. The second characteristic value to show the uniformity of screen luminance is the ratio (R) of the luminance at the center of the screen to that at the edge of the screen, the luminance being measured by ISO, R782.

d. Resolving power

This term designates the number of lines per 1 mm which are resolvable on the screen. The resolving power of the screen should be determined upon considering the resolving power of the human eye, and thus the resolving power of the screen is desirably equal to or more than that of the human eye (7 to 10 lines/mm).

Hereinafter, the advantages and disadvantages of the four conventional types of rear projection screens will be explained using the above defined optical characteristic values.

With regard to scintillation, the micro-optical element screen is most inferior. This is considered to be caused by the facts that in this kind of screen each micro-element forms an independent image element, and the whole image comprises an aggregation of spots of light from these image elements, and that light from the projection light source is subjected to one or more scatterings or refractions at the interface between a transparent member having a micro-element structure and air, whose refractive indices are substantially quite different, thereby resulting in an uneven light distribution. Scintillation, therefore, is a characteristic of a micro-optical element screen, and, thus, it is impossible to reduce scintillation. On the other hand, the micro-optical element screen has the advantage that it's light redistribution characteristic can be controlled at will.

The dispersion screen is secondly high in scintillation. To decrease scintillation of this screen, it has been proposed that the difference in refractive index between the light scattering particles and the binder be reduced as much as possible, and, at the same time, the number of scattering particles per unit area, i.e., the particle density, be increased by decreasing the size of the particle. Such a method is described in Japanese Patent Application (OPI)2127/1971 and in U.S. Pat. No. 3,712,707. In accordance with this method, although scintillation can be decreased, other disadvantages are encountered, e.g., the diffusion characteristic increases excessively, thereby resulting in a decrease in resolving power, and, furthermore, the transmittance decreases due to an increase in the reflectance of the screen, thereby resulting in a considerable decrease in the image reproduction range.

In the dispersion screen, therefore, a decrease in scintillation and an increase in resolving power, diffusion characteristic, and image reproduction range cannot be simultaneously achieved, and thus it is impossible to produce a rear projection screen having excellent optical properties by increasing the optical characteristics thereof as a whole. Moreover, this dispersion screen is, due to its high diffusion characteristic, subject to the limitation that the thickness of the diffusion material should be controlled to about 100 μ or less when a resolving power of about 10 lines/mm or more is desired.

Furthermore, with both the micro-optical element screen and the dispersion screen, the image reproduction range is low, and it has been impossible to faithfully reproduce the wide image density region which a photographic film possesses.

On the other hand, the wax screen and the crystalline polymer screen are excellent in scintillation image reproduction range and resolving power.

In particular, the wax screen has excellent optical characteristics as compared with the other types of screens in that scintillation is very low and the image reproduction range is very broad.

These features of a wax screen are considered to be due to the fact that wax crystals exhibit complicated structures.

Wax can have complicated crystal shapes (e.g., twig shaped, needle shaped, plate shaped or block shaped, etc). Depending on the crystallization conditions, there is a small density difference (refractive index) between crystalline regions or between crystalline areas and non-crystalline areas, and the refractive index substantially continuously changes at the interface thereof, whereby incident light is passed through a complicated density zone in the light diffusion layer with multi-refraction and multi-scattering without total reflection, so that light is not reflected in the incident direction.

On the other hand, the crystalline polymer screen is inferior scintillation and image reproduction range to the wax screen. This is considered to be due to the fact that the length of a crystalline polymer increses with an increase in the molecular weight thereof, thereby resulting in an increase in melt viscosity, and that crystalline polymers do not have complicated crystalline structures at crystallization, and, in general. a micro-structure in which spherical crystals generally called spherulites are present is obtained. In order to remove these defects, an attempt to deform such a spherulite structure has been made, as is described in Japanese Patent Publication 19257/1973 and U.S. Pat. Nos. 3,573,141, 3,591,253 and 3,682,530. However crystalline polymer screens having optical characteristics as excellent as wax screens have not been obtained.

With respect to light redistribution, the micro-optical element screen is, as described above, superior. With the other types of screens, in general, only diffusing properties can be controlled, and it has been impossible to redistribute light onto a predetermined observation region.

The advantages and disadvantages of the four types of rear projection screens conventionally used will be understood from the above explanation. Among these screens, the micro-optical element screen and the dispersion screen are mainly used at present (see, for example, U.S. Pat. Nos. 2,180,113 and 2,480,031). With these screens, however, poor optical characteristics are achieved, and, thus, it has been impossible to produce a rear projection screen of these types having desired optical characteritics.

For this reason, attempts to combine the features of both such screens to make up for the defects thereof have been made. For example, Australian Patent 130,137 and Japanese Patent Application-(OPI)2127/1971 describe coating or bonding a light diffusing material layer with light scattering particles dispersed in a binder onto a Fresnel lens plate and Japanese Utility Model Publication 7051/1973 describes embossing a lenticular structure on the surface of a light diffusing material layer having light scattering particles dispersed therein.

In the former method, however, scintillation is still not removed, and, in addition, a new problem occurs in that production is complicated due to joining two or more structures into one united body through coating or bonding. Further, resolving power is decreased. The latter method also fails to improve scintillation. In this method, the thickness of the diffusing material layer should be maintained at low levels in order to maintain the resolving power at a fixed level, and, thus, the thickness of the diffusing material layer varies relatively greatly as compared with the total thickness due to the micro-optical elements provided on the surface. As a result, the diffusing properties of the difussing material layer greatly change in a local fashion, and, finally, the micro-optical element changes the diffusing properties of the diffusing material layer.

On the other hand, although the wax screen possesses, as described above, excellent optical properties, it has been difficult to use on a practical basis due to its low mechanical strength. That is, since wax is very soft and brittle, it is difficult to produce a screen in the form of a sheet from wax alone. For this reason, it has been necessary to interpose wax between two transparent supports as described in Japanese Utility Model Publication 21110/1969. With a rear projection screen, however, since loss of light is caused at the interface between materials having different refractive indices, it is desired to minimize the number of interfaces. Thus, the above sandwich structure has the defect that the number of interfaces is large. In addition, such a structure cannot be produced with ease. Moreover, such a structure has the disadvantage that the wax peels off the transparent support or breaks with the passage of time due to the chemical inertness and brittleness of the wax itself. Furthermore, with such a structure it is difficult to control the light redistribution characteristic, and, thus, desired optical characteristics cannot be achieved. The inventor's research has revealed that in the case of providing a micro-optical element structure on the surface of a transparent support for the purpose of increasing the light redistribution characteristic, a considerable reduction in resolving power is encountered, and, thus, it has been impossible to use such a structure on a practical basis.

As a result of the inventors' research on wax screens, it has been found that it is possible to produce a wax screen of excellent mechanical strength and bonding properties by adding a wax modifying agent thereto as is described in Japanese Patent Application 446/1975, filed in the United States on Dec. 29, 1975 under Serial No. 644,683 in the names of Junji Miyahara and Hisatoyo Kato, hereby incorporated.

Even with such improvements, however, wax screens and crystalline polymer screens have an insufficient light redistribution characteristic, and many difficulties are encountered in producing such rear projection screens with desired optical characteristics.

SUMMARY OF THE INVENTION

As a result of the inventors' research to produce a wax screen or crystalline polymer screen with desired light redistribution characteristic, an important fact has been found. That is, with wax screens and crystalline polymer screens, their resolving power hardly decreases even though the thickness of the diffusing material layer is about 1 mm or more. This fact is opposed to the knowledge of the art since dispersion screens hitherto widely used require a thickness of about 100 μ or less so that resolving power is maintained at levels higher than the human eye.

Based on these findings, it has been found that the excellent light redistribution characteristic of micro-optical element screens can be achieved by directly combining a wax screen or crystalline polymer screen and a micro-optical element screen, and, at the same time, the wax diffusion material layer or crystalline polymer diffusion material layer controls scintillation inherent in the micro-optical element structure, so that scintillation can be controlled to low levels as in the case where the diffusion material layer is comprised of wax or a crystalline polymer alone, and, thus, the light redistribution characteristic is improved without materially changing the excellent optical characteristics of wax screens or crystalline polymer screens.

One object of the present invention is to provide a rear projection screen which exhibits low scintillation, is provided with a wide image reproduction range and sufficient resolving power, and which possesses a desired light redistribution characteristic.

Another object of the present invention is to provide a rear projection screen which is capable of controlling the light redistribution characteristic without changing the excellent image reproduction range and low scintillation of wax screens or crystalline polymer screens.

A further object of the present invention is to provide a rear projection screen which can be produced with less production steps and at low cost, and which possesses desired optical characteristics.

These objects of the present invention are attained by directly providing unevenness on at least one surface of a light diffusing plate containing at least one light scattering material selected from the group consisting of one or more waxes, one or more crystalline polymers or a mixture thereof.

DETAILED DESCRIPTION OF THE INVENTION

A "wax" as is used in this invention is a solid having a waxy external appearance and waxy properties at normal room temperature, for example, it is semi-transparent, soft, fragile and non-film-forming. Examples thereof are given below.

I. Natural wax (supplied from animals and plants)

Japan-wax, carnauba wax or cotton wax (plant wax); insect wax, bees wax or whale wax (animal wax).

II. Petroleum wax (which is a solid hydrocarbon at normal room temperature obtained from petroleum) such as paraffin wax having a boiling point of not less than 125° F, microcrystalline wax (e.g., Hi-Mic produced by Nippon Seiro Co.).

III. Synthetic waxes (wax-like solids obtained by synthesis) such as oligomer waxes. e.g., vinyl oligomer waxes such as ethylene oligomer waxes, propylene oligomer waxes, ethylene oxide oligomer waxes, propylene oxide oligomer waxes or a mixture thereof. Ethylene oxide oligomer wax is sold as Carbowax by E.I. du Pont de Neours & Co., Inc. Oligomer waxes have a molecular weight of not more than about 10,000, preferably not more than 5,000. The oligomer waxes employed in this invention are solids having a waxy external appearance and waxy properties and have a melt index of not less than about 1,000 (according to the method of JISK 6760 (1971)).

As should be apparent to one skilled in the art, mixtures of various compatible waxes as set forth above can be used as desired.

Crystalline polymers as used herein are those polymers having a molecular weight of not less than 10,000, preferably not less than 20,000, and capable of forming a film by themselves, and those solids containing the structure, a part or all of which shows a crystallization state, such as polyolefins, e.g., polyethylene, polypropylene, and the like, polystyrenes, polycarbonates, polyesters, polyamides, polyurethanes, polyvinyl alcohols, polyesters, polyesters, e.g., polyesters such as polyethylene terephthalate, polyamides such as 6,6-nylon, polyurethanes such as polytetramethylenehexamethyleneurethane, polyesters such as polyoxymethylene, etc., and the like.

A diffusion plate containing the above wax as a light scattering material is produced in the form of a sheet by molding the wax by casting, injection molding, extruding onto a support or the like.

A diffusion plate containing the above crystalline polymer as a light scattering material is produced by molding the crystalline polymer in the form of sheet by calendering, extrusion, injection molding or a like method.

As the light diffusing material for the diffusion plate of the present invention, wax and crystalline polymers can be used singly or in combination with each other. That is, since most of the wax and crystalline polymers are mutually miscible with each other in the molten state, and different crystalline structures are obtained upon cooling them, diffusion characteristic can be changed at will.

It goes without saying that the present invention includes a member as is described in U.S. Pat. No. 3,832,315, in which wax is dispersed in a transparent resin, e.g., an acrylic resin, and the wax acts to scatter light, so long as the wax functions as a light scattering material. The same is true of the case where a crystalline polymer is dispersed in a transparent resin, e.g., an acrylic resin, or wax and a crystalline polymer are dispersed together. In these cases, the composite transparent resin in which at least one of the wax or crystalline polymer is dispersed is a diffusion plate of the present invention.

It is believed, as will become apparent from the following detailed description, that an irregular distribution of refractive index of the wax or crystalline polymer caused by the irregular crystal/amorphous substance micro-structure thereof provides an excellent diffusion effect. From this view, the diffusion member is not limited only to crystal/amorphous substance structures, and it is considered possible to employ a method in which a latex, which is fine and broad in size distribution, is produced from transparent materials having slightly different refractive indices and being mutually soluble, the resulting mixture is molded in the sheet form, and the surface of the sheet is suitably dissolved on heating or with a solvent to make the surface of the latex continuous.

The formation of unevenness directly on the surface of the diffusion plate in the present invention is to provide a micro-optical element structure directly on the surface of the diffusion plate.

Unevenness on the surface of the diffusion material utilized in accordance with the present invention can be described as comprising a plurality of closely spaced micro-optical elements, the term "micro-optical element" meaning light refracting elements of good optical quality that are generally smaller than can be resolved by the human eyes at useful viewing distances from the screen. In this broader definition, the term "refracting" is taken to include refracting, focusing and diverging.

In one effective micro-optical element structure of the present invention, optical elements having a fine surface designed so that light is refracted, focussed or diverged, are arranged on a plane, and refraction, focusing, and divergence of light is carried out utilizing the difference in the refractive index between air and the diffusion layer. For example, refraction effects are typically achieved by the use of a lenticular lens or a fly's eye lens focusing is achieved by the use of a Fresenel lens and a diverging is typically achieved utilizing a V groove structure, as these effects and the structures are understood by one skilled in the art.

The size of each element of the micro-optical element structure is required to be sufficiently small to provide the screen with a certain resolving power. Although the size is desirably made as small as possible, it cannot be set unequivocally since the required resolving power varies depending on the distance between the observer and the observation surface. Since the resolving power of the observer, i.e., the human eye, is at most about 10 lines/mm, it is preferred that the size of each element generally range, as a pitch between about 0.05 and about 2 mm, preferably about 0.05 to 0.4 mm, pitch typically being measured from the center point of one element to the center point of the next adjacent element.

As described above, the micro-optical element structure can change in form depending on the optical effect desired. To increase uniformity of screen brightness on the side of the observer, a one-dimensional or two-dimensional Fresnel lens can be used to broaden the observation region in a specific direction, a lenticular lens or v type grooves (as described later) can be used; and to make the observation region uniform, a fly's-eye lens and random unevenness as described in Japanese Patent Application (OPI)66833/1973 can be used.

The thickness of the diffusion plate containing at least one light diffusing material selected from wax and crystalline polymers is not subject to any special limitation so long as it does not deteriorate the resolving power of the screen. Furthermore, since the required resolving power of the screen varies, as described above, depending on the distance between the observer and the observation surface, it cannot be unequivocally set. In view of general uses of such a screen, the thickness of the diffusion plate generally ranges between about 0.1 mm and about 10 mm, preferably 0.1 mm and 2 mm.

In this way, in the present invention, the thickness of the diffusion plate can be made large as compared with conventional diffusion plates. Therefore, even though a micro-optical element structure is provided on at least one surface of the diffusion plate, the thickness of the diffusing material layer does not change relatively largely as compared with the total thickness, and thus the micro-optical element structure does not change the diffusion properties of the diffusion plate.

To provide unevenness directly of the surface of the diffusion plate according to the present invention, one can directly emboss the surface of the diffusion plate using a female mold, cut the surface of the diffusion plate, etc.

Any known method can be used to emboss the surface of the diffusion plate. Preferred methods are: (a) pressing a female mold with the micro-optical element structure onto the surface of the diffusion plate under heat and pressure (typically, a temperature which is merely high enough to soften the diffusion material is used (generally on the order of about 80° to about 300° C) in combination with a pressure merely sufficient to emboss the unevenness onto the surface of the diffusion material (generally a pressure on the order of about 10 to about 100 Kg/cm²); and (b) a female mold with the desired micro-optical element structure previously embossed thereon is used as the mold in producing the diffusion plate by casting, injection molding, etc. In this case, the female mold can be produced by: (1) cutting with a mechanical cutter or electromechanical transducer, as described in Japanese Patent Application (OPI) 66833/1973, for example; (2) using a mask pattern to provide a predetermined micro-optical element structure by printing on a gelatin-containing photographic film and developing to provide a relief of the above micro-optical element whereafter a female mold of metal is produced by electroforming, etc., as described in Japanese Patent Publication 5504/1972; (3) producing various matted surfaces by by sandblasting or chemical etching, etc., or (4) producing micro-pattern by laser irradiation, electron beams, etc. Useful methods are also disclosed in detail in "Plastic Engineering Handbook of the Society of the Plastic Industry", Reinhold Pub. Co. Inc., New York (1960), in the chapters on "Molding" "Injection", "Extrusion" and "Forming" thermoplastic sheets.

Methods of cutting the diffusion plate include using a mechanical cutter, an electromechanical transducer, etc.

In the present invention, it is preferred to use wax modifying agents as are disclosed in Japanese Patent Application 446/1975, filed in the U.S. as application Ser. No. 644,683, on Dec. 29, 1975, earlier incorporated, in order to improve mechanical strength and bonding properties. However, since the mechanical strength and bonding properties required for a screen vary depending on the size of the screen, etc., high mechanical strength and good bonding properties are, in some cases, not required. In these cases, i.e., where high mechanical strength and good bonding properties are not required, the above wax modifying agent is not necessarily added.

As typical examples of wax reforming agents (for improving the mechanical strength and adhesiveness of wax without losing the excellent optical properties of wax) which are polymers miscible with the wax, there are:

I. Natural substances and derivatives thereof such as rosins (e.g., rosin, modified rosin or rosin esters), terpene resins, terpene phenol resins and other natural resins.

II. Synthetic resins such a resins containing polar groups (e.g., phenolic resins or xylenic resins), petroleum resins e.g., aliphatic, alicyclic or aromatic petroleum resins), cumarone indene resins or styrene resins. More preferred materials are ethylene-vinyl acetate copolymers (hereinafter referred to as "EVA"), polyisobutylene (preferred molcular weight: about 35,000 to about 2,100,000), polybutene (preferred molecular weight: about 500 to about 3,000), rosin and atactic polypropylene. Preferred EVA's contain about 15 to about 40 wt% vinyl acetate and have a melt index of about 200to about 400 (by JISK 6760 (1971)), for example, "Evaflux" manufactured and sold by Mitsui Polychemical Co., Ltd. One useful polyisobutylene is available as "Vistanex" manufactured by Esso Co., Ltd.

By adding these wax reforming agents, the mechanical strength and adhesiveness of wax are increased without losing the excellent optical properties which wax inherently has.

More specifically, in accordance with the present invention the mechanical strengths of a wax such as the tensile strength, the compressive strength, the fatique strength and the like can be improved, even more specifically, such valuable mechanical strengths can be retained with the passage of time and at elevated temperatures.

The amount of the wax reforming agent added is about 0.1 to about 80 wt%, based on the total weight of wax and all additives. For instance 1 to 50 wt% EVA, 0.5 to 20 wt% polyisobutylene and 1 to 30 wt% polybutene (same basis) can be used to form highly preferred systems. Where the difference of refractive index between the wax reforming agent and the wax is small, whereby mechanical strength and adhesiveness are increased without losing optical properties, larger amounts of the wax reforming agent can be added.

Where the amount of the wax reforming agent is less than about 0.1 wt%, the mechanical strength of the wax screen does not increase, and where the amount is equal to or more than about 80 wt%, the reproduction range and resolving capability decrease. The wax reforming agent can be used alone or as a mixture thereof.

Any method can be used to add the wax reforming agent to the wax, but preferably the wax reforming agent is gradually added with stirring to molten wax. For example, when EVA is added to paraffin wax, the paraffin wax is melted at about 120° C, and then pellets of EVA are gradually added to the molten paraffin with stirring. After sufficient stirring, the viscosity of the molten mixture is measured. When the viscosity is constant, EVA is completely dissolved in the paraffin. After the pellets are completely dissolved, the next small amount of pellets is added with stirring.

Wax modifying agents are added, as described above, to improve the mechanical strength and the bonding properties of the wax, and the wax modifying agent is added in an amount which does not change the diffusion characteristics of the wax. Thus, this case is clearly distinguishable over the case where the wax and crystalline polymer are present simultaneously.

In addition to the above wax modifying agents, those additives as are generally used in fields where wax or crystalline polymers are used can be used as additives for the wax or crystalline polymer of the present invention. For example, antioxidants and ultraviolet ray-absorbants can be added for the purpose of improving the stability with time of the wax or crystalline polymer.

Antioxidants as are used in the present invention are required to be soluble in the wax or crystalline polymer and to not substantially deteriorate the optical characteristics of the wax or crystalline polymer.

Preferred phenol-based antioxidants include 4,4-bis-(6-tertiary-butyl-3-methyl-phenol), alkylated bisphenol, 2,4,5-trihydroxybutylophenone, 2,6-di-tertiary-butyl phenol, 2,6-di-tertiary-butyl-p-cresol (for example, Sumilizer-BHT produced by Sumitomo Chemical Co., Ltd.), 2.2'-methylenebis-(6-tertiary-butyl-4-methyl phenol) (for example, Sumilizer-MDP), 2,6-ditertiary-butyl- -dimethylamino-p-cresol (for example, "Ethyl Antioxidant 703+ produced by Ethyl Corp.), 4,4'-bis-(2,6-di-tertiary-butyl phenol) (for example, "Ethyl Antioxidant 712" produced by Ethyl Corp.,), 4,4'-methylene-bis-(2,6-di-tertiary-butyl phenol) (for example, "Ethyl Antioxidant 702" produced by Ethyl Corp.), and the like.

Preferred amine-based antioxidants include N,N'-dinaphthyl-p-phenylenediamine, and the like; preferred organic phosphorous-based antioxidants include tris-nonylphenyl phosphite, and the like; and other preferred antioxidants include distearylthiodiprodionate, dilauryl thiodipropionate, triazine derivatives such as 2-hydroxyamino-4,6-dimethyl-1,3,5-triazine, 2-mercapto benzoimidazole and the like.

The amount of antioxidant added when such is used is about 0.05 to about 3.0% by weight, preferably 0.01 to 1.0% by weight of the total weight of the wax or crystalline polymer and all additives. Of course, two or more antioxidants can be used in combination with each other.

On the other hand, ultraviolet ray absorbants used in the present invention are required to be soluble with the wax or crystalline polymer and not to materially deteriorate the optical properties of the wax or crystalline polymer.

Particularly preferred ultraviolet ray absorbants are ultraviolet ray absorbants comprising salicylic acid derivatives, e.g., p-octylphenyl salicylate, and the like; benzophenone based ultraviolet ray absorbants such as 2-hydroxy-4-octoxybenzophenone (for example, R 130 produced by Sumitomo Chemical Co., Ltd.), 2-hydroxy-4-octadecyloxy-benzophenone, 4-dodecyloxy-2-hydroxybenzophenone, and the like; benzotriazole based ultraviolet ray absorbants such as 2-(2'-hydroxy-4'-n-octyloxyphenyl) benzotriazole (for example, Sumisoap R 510 produced by Sumitomo Chemical Co., Ltd.); nickel-bis-octylphenyl sulfide; substituted acrylonitriles such as -methoxypropionacrylonitrile; aromatic ester compounds such as 2-hydroxy-5-chlorobenzoic acid-glycidyl ester; organic phosphorous compounds such as a triphenylphosphite ester; sulfur compounds such as 4,4'-thiobis-(6-t-butyl-3-ethyl-phenol); and the like.

The amount of ultraviolet ray absorbant added when such is used is about 0.001 to about 1.0% by weight of the total weight of the wax or crystalline polymer and all additives. In the rear projection screen of the present invention in which a micro-optical element structure is provided directly on the surface of a diffusion plate containing at least one light scattering material selected from the group consisting of wax and crystalline polymers, light from the projection light source is deflected due to the micro-optical element structure directly provided on the surface of the diffusion plate. This light is then subjected to diffusion due to the micro-structure of the diffusion layer per se while passing through the diffusion plate.

If this diffusion action is seen in the broad perspective as being characteristic of the wax or crystalline polymer based diffusion plate, back scattering (reflection) is quite low, and most of light is diffused forward. Upon microscopic view, by repeated refraction of light through the diffusion layer of wax and/or crystaline polymer, this diffusion acts to render uniform any microscale unevenness in light intensity or scintillation formed on the above micro-optical element so that an image of high quality is obtained which is free from microscale unevenness and scintillation which can be viewed with ease and which does not fatigue the eyes of the observer.

To achieve the maximum excellent light redistribution properties of the micro-optical element and the excellent diffusing properties of the wax or crystalline polymer, it is preferred to maintain the diffusion properties of the diffusion plate at relatively low levels (for example, $\theta \frac{1}{2}$ = about 5° to about 25°, preferably about 7° to about 20°, and often $\theta \frac{1}{2}$ = about 10°), by means of the redistribution characteristic of the micro-optical element.

The present invention will now be further explained by reference to the accompanying drawings.

FIGS. 1 to 5 are schematic views showing embodiments of the present invention. In the Figures, 1 is a projection optical system which projects an image onto a rear projection screen from the back side thereof, 2 is an observer of the image projected on the screen from the front thereof, 3 is a diffusion plate, and 4 is a distribution curve of luminous intensity showing the diffusion light passed through the screen.

Figure 1:
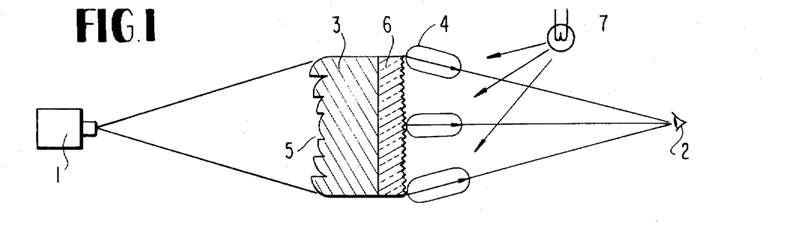
FIG. 1 illustrates an embodiment of the present invention in which a Fresnel lens structure is used as the micro-optical element structure.

FIG. 1 shows an embodiment of the present invention in which a Fresnel lens structure 5 is used as the micro-optical element structure and 6 is a transparent support. Light from the projection light system 1 is first refracted by the Fresnel lens structure and focused on the converging point of the Fresnel lens, and is then subjected to a diffusion action while passing through the diffusion plate 3. The light passed through the screen shows a light distribution as is shown by the distribution curve of luminous intensity 4 due to the multiple diffusion action of the diffusion plate 3 and the converging action of the Fresnel lens 5. Thus, if the observation position 2 is placed in the neighborhood of the converging point of the Fresnel lens 5, it is possible to observe an image which is uniformly bright over the whole surface of the screen.

On the other hand, if the observation position is placed apart from the converging point of the Fresnel lens 5, the brightness of the screen decreases in proportion to the diffusion characteristics of the diffusion plate 3, but uniformity of the brightness is not lost.

Therefore, this structure is preferred in the case where uniformity of brightness is required rather than in the case where the observation region is broad. In particular, where the observation position is placed in the neighborhood of the converging point of the Fresnel lens 5, since the brightness on the periphery of the screen particularly increases, the whole screen is bright. According to this effect, there is the merit that as a whole an uniform, sharp and clear image can be obtained since the image reproduction ranges remarkably improved at the peripheral part of the screen.

If the projection light is converged to one point by the lens 5, the viewer may feel that the viewing area becomes too narrow. In this case, the degree of converging action should be decreased. For instance, a Fresnel lens structure which changes the dispersing light from the projection light system 1 into almost parallel light can be sometimes used.

In the FIG. 1, a transparent support 6 adhering the diffusion plate 3 is used. Such transparent support 6 is a necessary component when the mechanical strength of the diffusion plate 3 is not enough for the mechanical strength required for the screen. However, the support 6 is not always required when the mechanical strength required for the screen is not so large or much, the mechanical strength of a wax used for the screen is improved by using a wax modifing agent or a crystalline polymer is used for the light scattering material.

For the transparent support 6, materials having the properties of transparency, high strength and no diffusing effect are used.

Where transparent support 6 is used, it goes without saying that the micro-optical element structure should be embossed only on the side of the diffusion plate 3 which is not bonded to the transparent support. Preferred transparent supports have a transmission factor of from about 20% to 100%; the transmission factor can be altered by appropriate coloring. Typical supports include transparent plates made of glass, acrylic resin, polycarbonate, polystyrene, polyvinyl chloride, polyethylene terephthalate, triacetyl cellose, etc.

The thickness of the transparent support 6 preferably ranges between about 0.5 mm and about 20 mm, and the transparent support 6 is preferably arranged so that it faces the viewing position 2 in order to protect the diffusion plate 3 from the external environment.

Moreover, in FIG. 1, the side of the transparent support 6 which faces the observation position 2 is slightly matted (hereinafter, this side is referred to as a non-glare surface). This matting is carried out so that when the rear projection screen is used under room light 7, reflected room light from the front of the screen is prevented from coming into the eyes of the observer and interfering with viewing.

In some cases, however, reflected room light is not harmful, depending on the method and position of viewing. In these cases, provision of a non-glare surface causes reflection of a certain amount of light in all directions, thereby interfering with viewing. Thus, the present invention does not necessarily require the provision of a non-glare surface. Moreover, even in case where transparent support 6 is not used, it is possible to provide a non-glare surface on the diffusion plate 3 itself.

A suitable bonding agent or adhesive is used to bond the diffusion plate 3 to the transparent support 6. The bonding agent or adhesive is desirably transparent, but it may be colored to the extent that no harm to viewing is caused when a thin film is produced therefrom. Preferred bonding agents or adhesives include rubber adhesives such as polyisobutylene and the like, polyurethane (such as polyisocyanate) based bonding agents, hot melt type bonding agents such as ethylene vinyl acetate, photocurable bonding agents(oligoesteracrylates), etc. It is preferred from the optical stand-point that the thickness of the bonding agent or adhesive layer be as thin as possible, preferably not more than about 100 μ. To increase the bonding area, matting of both sides to be bonded and activation of the sides to be bonded can be simultaneously applied, if desired.

Although FIG. 1 shows only a sectional view of the Fresnel lens structure, this structure may be either one dimensional or two-dimensional according to the end use. A two-dimensional structure in which a one-dimensional structure is extended coaxially (a so-called circular lens type structure) or a two-dimensional structure in which one-dimensional structures intersect at right angles as shown in U.S. Pat. No. 2,726,573 can be used. Those lenses having various forms, e.g., a form in which the focal length is different in two directions which cross at right angles, spherical or non-spherical forms or like forms can be used.

Figure 2:
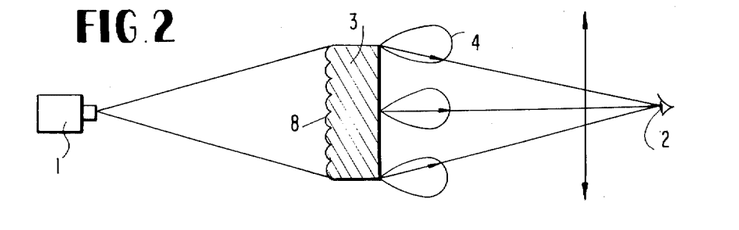
FIG. 2 illustrates an embodiment of the present invention in which a lenticular lens structure is used as the micro-optical element structure.

FIG. 2 shows an embodiment of the present invention in which a structure comprising a lenticular lens 8, where a number of cylindrical lenses are present, is used as the micro-optical element structure. In the case of the structure shown in FIG. 2, each of the fine lenticular lens 8 acts to diverge light, and this action and the diffusion action of the diffusion plate 3 overlap to increase the diffusion characteristic of the screen as a whole. This type of rear projection screen, therefore, is effective in broadening the observation region of the screen. In FIG. 2, if the lenticular lens 8 is one-dimensional, it is possible to increase the diffusion characteristic only in the direction in which the lenticular lens 8 recurs as shown by the vertically disposed arrow in FIG. 2. This feature can be effectively utilized in the case where many persons observe the image on the screen. That is, in such a case the light redistribution characteristic of the screen is such that the observation region is most broadened in the horizontal direction and least broadened in the vertical direction.

This object can be attained with ease by arranging the lenticular lens 8 structure to repeat in the horizontal direction.

In FIG. 2, a lenticular lens 8 structure in which a large number of convex type cylindrical lenses are arranged is shown. In addition, a structure in which convex and concave lens are arranged one after the other to make the sectional form smooth, i.e., in a regular sinusoidal pattern as indicated adjacent numeral 8 in FIG. 4, can also be used. In addition, a so-called fly's eye lens in which the lenticular lens structure 8 is arranged two-dimensionally can be used, and those types in which the focal length is different depending on the direction, or those having the same focal length in any direction or spherical or non-spherical ones, etc., can be used.

Figure 3:
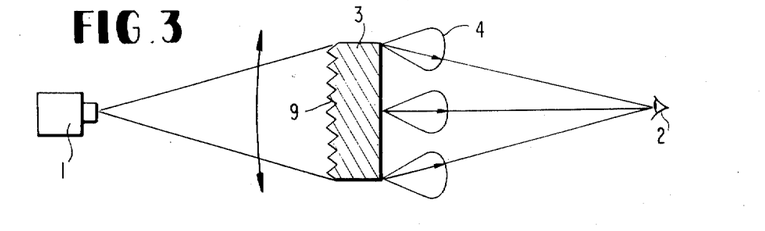
FIG. 3 illustrates an embodiment of the present invention in which a V groove structure is used as the micro-optical element structure.

FIG. 3 shows an embodiment of the present invention in which a lenticular plate structure having a specific section is used as the micro-optical element structure, which is called a V groove 9 since the sectional view is in the form of a V groove. In FIG. 3, light from the projection optical system 1 is first refracted by the V groove structure 9 and divided into light in two different directions. Since light in each direction, is diffused by the diffusion plate 3, the light passed through the diffusion material 3 becomes diffusion light having a broader diffusion width in the direction of division than the light passed through a diffusion material 3 of a uniform structure, i.e., referring to FIG. 3 the light passed through the screen has a broader diffusion width in the direction shown by the arrow. Micro-unevenness of light produced by the V groove optical element 9, i.e., scantillation is made uniform while light is passing through the diffusion plate 3, and thus it enters the eyes as diffusion light which is uniform and of low scintillation. In this way, the V groove structure provides surfaces which contact the light from the projection light system 1 at two different angles, and light is refracted in the opposite direction from each surface when it is irradiated on either sides of the V groove 9. Thus, the same effect as in the case where an even diffusion plate 3 is irradiated with two light sources can be obtained.

Figures 6, 7:
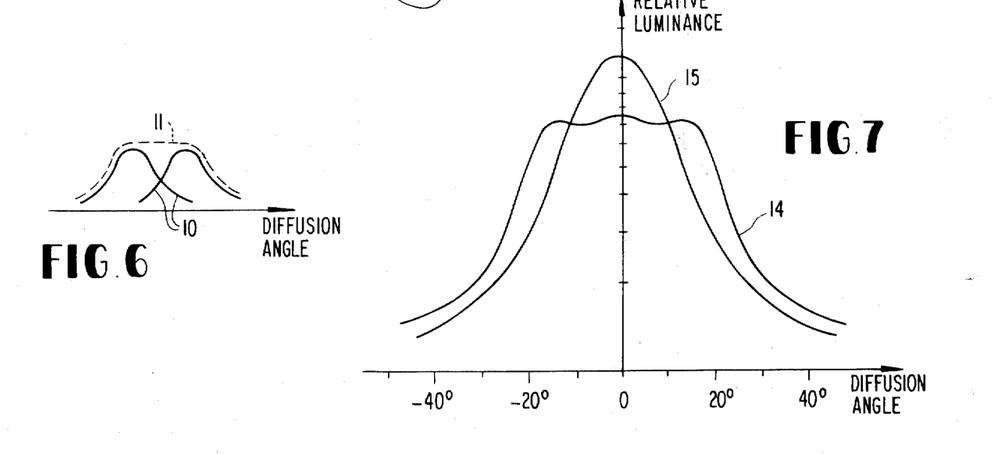
FIG. 6 illustrates the diffusion distribution curve for the case where a V groove structure is used as the micro-optical element structure.
FIG. 7 shows the light redistribution characteristic curve of the screen of Example 2.

Therefore, as shown in FIG. 6, if curve 10 is the diffusion distribution curve of the diffusion plate 3 itself (ordinate being relative brightness and abscissa being relative angle), the diffusion distribution curve of the screen provided with a V groove structure as shown in FIG. 3 is broad in the form of trapezoid as shown by curve 11.

Where this V groove 9 is used as the micro-optical element structure, as compared with the case where the cylindrical lenticular lens structure 8 as shown in FIG. 2 is used, redistribution of light is relatively uniform within a certain angle, but it rapidly decreases outside this range. Thus, this V groove 9 structure has the advantage that light can be redistributed effectively and uniformly in a certain region. Furthermore, as compared with other micro-optical element structures, diffusion plates of an excellent light redistribution characteristic can be obtained.

Since the V groove optical element 9 can only divide light into two directions and cannot diffuse light as conventional micro-optical screen can, it has never been proposed for use in a rear projection screen. A V groove optical element can be used for rear projection screens only when it is used in combination with a diffusion plate 3 containing at least one light scattering material selected from the group of wax and crystalline polymers. At the same time, the synergistic effect of the combination enables one to obtain a desired light redistribution characteristic.

When consided from the standpoint of function, this V groove 9 seemingly divides the light source, and when used in combination with the diffusion layer, it broadens the whole diffusion properties due to the synergistic effect thereof, and the V groove element may be called a light source division micro-element (hereinafter generically termed such). Various elements having this function are included in the term V type groove optical element.

For example, if a groove having a trapezoidal section in place of a V section is used, the light source can be seemingly divided into three, and if a groove having a section in the form of a toothed wheel with a large pitch is used, the light can be divided in numerous directions due to the diffraction effect.

This structure may be either one-dimensional or two-dimensional. In the case of a two-dimensional structure, light source division micro-elements having different characteristics, depending on the direction, can be used in combination with each other.

Since such a light source division micro-element, e.g., a V groove, is composed of flat surfaces rather than the curved surfaces as in the case of conventional lenticular structure and fly's eye lens, it has the advantage, as compared with the lenticular lens and fly's eye lens with a curved section, that it can be produced with ease and at low cost.

In another micro-optical element structure, each surface of the elements constituting the micro-optical element is arranged so that the structure redistributes light uniformly only in a predetermined observation region. Such a structure can be produced with ease using an electromechanical transducer. Moreover, a structure as described in Japanese Patent (OPI) 66833/1973 which comprises a plurality of contigious grooves, each groove having a depth which undulates at a random spacial frequency within a predefined spacial frequency range to define a row of contiguous micro-elements of random size, can be used. In this case, each micro-element is controlled to redistribute substantially all of the incident light through a predefined audience space in such a manner that its luminance, viewed from any point in the audience space, is substantially constant.

The above described typical micro-optical element structures can be used in combination with each other, if desired.

Figure 4:
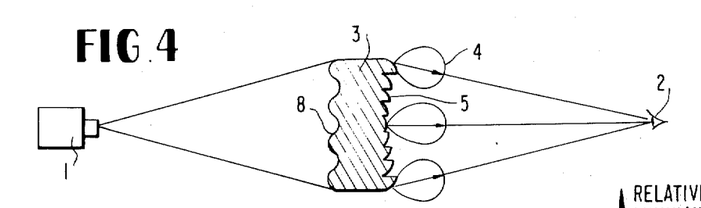
FIG. 4 illustrates an embodiment of the present invention in which a Fresnel lens and a lenticular structure are provided on different sides of a diffusion plate.

FIG. 4 shows an embodiment of the present invention in which one side of the diffusion plate 3 is provided with a Fresnel lens structure 5, and the other side is provided with a lenticular lens structure 8. The use of such a structure enables one to produce a screen which has increased diffusion characteristics, i.e., a broadened observation region and which has a uniform brightness distribution.

Figure 5:
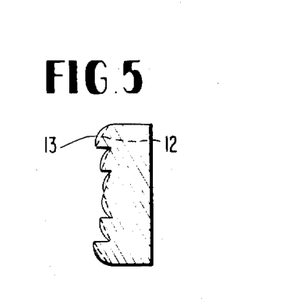
FIG. 5 illustrates an embodiment of the present invention in which a modified Fresnel lens structure is used.

In FIG. 4, the different micro-optical element structures are provided on different sides of the diffusion plate 3, but they can be provided on the same side of the diffusion plate 3, if desired, by molding. FIG. 5 shows a modified Fresnel lens 13 in a form such that fine convex lenses are adhered to each lens surface of the Fresnel lens structure 12. In this case, the effect of a Fresnel lens 5 and of the lenticular lens 8 can be attained by this single micro-optical element structure. Such micro-optical elements can easily be formed following the essential procedures set out, for example, in U.S. Pat. No. 2,480,031, etc.

Micro-optical structures in accordance with the present invention can be formed in accordance with the teachings in *Journal of the Optical Society of America* 41, 1951 p.807-815 "Thin Sheet Plastic Fresnel Lenses of High Aperture", U.S. Pat. No. 3,893,748 FIGS. 1, 2, and 4 and Japanese Patents (OPI) 101025/74 and 101026/74, etc. Many additional types of micro-optical elements and manners of producing the same are well to those skilled in the art.

The light redistribution characteristics of these micro-optical element structures are influenced by the refractive index of the diffusion plate on which the structures are provided. That is to say, the characteristics of the micro-optical element structure are determined based on the combined action of the form of the micro-optical element and the refractive index of the diffusion material. The refractive index of the diffusion material is not overly important in the present invention, and the diffusion materials of the present invention are not be limited in this respect. However, to provide the art with generally used values, most preferably the refractive index is from about 1 to about 2, and for most commercial purposes the refractive index will be about 1.5.

The present invention is not limited to the above embodiments, and various changes can be made within the scope of the appended claims.

Although unevenness is provided only on the side of the diffusion plate which faces the projection light source in the above embodiments except for that shown in FIG. 4, it is possible to provide the unevenness only on the side facing the viewing position while keeping the side facing the projection light source as it is, and results almost similar to those of the above embodiments can be obtained. This is because the projection light is uniformly diffused in the diffusion plate, and the thus diffused light illuminates the micro-optical element structure. The provision of unevenness on only the side facing the viewing position, however, is not preferred in that since the micro-optical element structure is exposed to the external environment it is liable to be damaged and its optical characteristics may change with the passage of time.

The micro-optical element structures are not limited to the above described ones, and can be selected depending on the end use of the screen. Needless to say, various combinations of micro-optical element structures can be used depending on the end use.

Where a transparent support is used, it is possible to incorporate coloring matter into the transparent support so that the color temperature and color tone of the screen can be controlled and that room light is absorbed and reflection thereof is prevented so as to improve the image reproduction of the screen.

Coloring matter which can be used in the present invention includes dyes such as Toluidine Blue, Brilliant Acid Blue, Cyanine Blue, Firstlight Red, Superchromium Yellow, Ethyl Orange, and the like; inorganic pigments such as titanium oxide, carbon black, cadmium red, barium yellow, cobalt green, manganese purple, and the like; azo pigments such as Vulcan orange, Lake Red, and the like; nitroso pigments; nitro pigments; basic dye based lakes; acid dye based lakes; Phthalocyanine pigments; organic fluorescent pigments; etc.

The coloring matter can be incorporated into a binder and coated on the support in place of incorporating it into the material of the support. Furthermore, it can be incorporated into the diffusion plate. The latter method can be used even in the case where a transparent support is not used.

The screen of the present invention can be used not only in an image display apparatus, but also in, for example, a microfilm reader, a film projection apparatus, etc. Furthermore, utilizing its excellent optical characteristics, it can be effectively used in a signal lamp, X-ray film reading apparatus, a lamp shade, or other display devices in which uniform surface brightness is required.

According to the present invention, the following novel effects are obtained.

1. A rear projection screen can be obtained which has a broad image reproduction range low scintallation and excellent light redistribution characteristics and resolving power.

2. Since the micro-optical element structure is provided by directly embossing or cutting the surface of the diffusion plate, a rear projection screen of excellent optical characteristics can be produced by a small number of steps.

3. A rear projection screen with excellent redistribution characteristics can be produced without deteriorating its excellent optical characteristics, i.e., less scintillation, a broad image reproduction range and the like, which a diffusion plate of wax or a crystalline polymer inherently possesses.

4. A rear projection screen in which the optical characteristics, scintillation, image reproduction range, etc., of a micro-optical element based screen are improved without deteriorating the excellent light distribution characteristics thereof can be produced.

5. Since the rear projection screen of the present invention is almost free from scintillation and it provides a broad reproduction range within a low luminance region which does not fatigue the eyes of viewers, it is possible to markedly reduce eye fatigue in microfilm reading, etc., and to markedly increase operation efficiency.

6. Since the rear projection screen of the present invention is free from scintillation and possesses a broad image production range and excellent light redistribution characteristics, it is possible to substantially faithfully reproduce the broad image density region of a photographic film on the screen.

7. Since the rear projection screen of the present invention has a broad image reproduction range and excellent light redistribution characteristics, it is substantially free from any influence of the surrounding light upon viewing, and the surface of the screen can be placed vertically or tilted slightly downward. That is, the screen is not limited in arrangement, for example, a part of the surface of a desk can be used as a screen, and, thus, the rear projection screen of the present invention has many applications.

8. In the rear projection screen of the present invention, if wax modifying agents are added to wax, a rear projection screen can be obtained which has high mechanical strength and excellent optical characteristics.

The present invention will be illustrated in more detail with reference to the following examples of presently preferred embodiments.

EXAMPLE 1

Isotactic polypropylene having a melt index of 2.5 and a density of 0.90 g/cm$^3$ was melted and held at a temperature of about 230° C for 2 minutes while stirring slowly to remove any bubbles.

The melt was poured into a pan comprising a metal sheet B with 0.8 mm lips at the edge. On the surface of metal sheet B, a female structure engraved was to produce a concentric spherical Fresnel lens having a focal length of 40 cm and a pitch of 200 μ using conventional equipment, well-known to Fresnel lens manufacturers. m A metal cover plate with a flat surface was placed over and in contact with the melt in the form and a pressure of about 10 Kg/cm$^2$ was applied while the melt was allowed to cool to 90° C at a rate of 10 degree/minute, the pressure being maintained as cooling took place.

The pressure was then removed and the melt allowed to cool to room temperature at which time it was removed from the form, resulting in Screen B.

For comparison purposes, Screen A was produced using the same procedure as above except using a metal pan with a flat surface (metal sheet A) in place of a metal sheet B.

The optical characteristics of these screens were compared, and the results obtained are shown in Table 1.

Table 1

|  | Screen A | Screen B |
| --- | --- | --- |
| Scintillation | ⊙ | ⊙ |
| Image Reproduction Range | 2.3 | 2.3 |
| Light Redistribution Characteristic (R)* | 5.7 | 1.6 |
| Resolving Power (1/mm) | not less than 13.5 | not less than 10 |

*Ratio of brightness in the center of the screen/Brightness around the screen edge measured by ISO R 782.
⊙scintillation is almost lacking Table 1 shows that Screen B had a markedly improved light redistribution characteristic. In this example, the concentric lines due to the risers of the Fresnel lens structure was inconspicous due to the diffusion of the polypropylene diffusion plate.

EXAMPLE 2

100 parts by weight of paraffin wax (m.p. 155° F) was melted at about 140° C, and into the melted wax 10 parts by weight of an ethylene-vinyl acetate copolymer containing 80 mole% ethylene and 20 mole% vinyl acetate, density of 0.94 g/cm$^3$ (ASTMD 1505), Vicat softening temperature 42° C, was gradually added and held at a temperature of about 140° C for 5 minutes while stirring slowly to mix uniformly and to remove any bubbles. The melted mixture was then poured into the one open edge of two stainless steel (40 cm sqaure) plates 0.70mm apart, which had excellent flat surfaces were maintained at 140° C. The interior surfaces of the stainless steel plates had been coated with a release agent (Teflon FEP produced by du Pont in the U.S.A.). The system was allowed to naturally cool down to 120° C and, after being held at 120° C for one hour, it was cooled at a cooling rate of 20° C/minute to room temperature. The stainless plates were then peeled off with care to produce Screen C. The cooling rate is not critical, and in this example the heating means was merely switched off and natural cooling permitted to proceed.

The surface of another screen the same as Screen C was then pressure molded with a female mold to provide a one-dimensional V groove structure of a top angle of 122° and a recurring pitch of 100 $\mu$ (i.e., the angle made by the apex of each inverted V was 122° and the distance between the apex of adjacent inverted Vs was 100 $\mu$) at 60° C and a pressure of 15 Kg/cm$^2$ to produce Screen D.

The optical characteristics thereof are shown in Table 2.

Table 2

|  | Screen C (even surface) | Screen D (one-dimensional V groove structure) |
|---|---|---|
| Scintillation | ⊙ | ⊙ |
| Image Reproduction Region | 2.6 | 2.4 |
| Light Redistribution Characteristic (θ ½) | 12° | 23° |
| Resolving Power (l/mm) | not less than 10 | not less than 10 |

⊙means scintillation is substantially absent

In Screen D, if the direction of the V groove structure was vertical, its light redistribution in the horizontal direction was as shown by curve 14 of FIG. 7, and its screen brightness distribution was more uniform as compared with curve 15 showing the light redistribution characteristic of Screen C not having a surface optical element structure. That is to say, it was found that Screen D had quite desirable characteristics where a number of viewers observed an image projected thereon at the same time. The light redistribution of screen D in the vertical direction was substantially the same as curve 15 showing the light redistribution characteristics of Screen C not having a surface optical element structure.

Scintillation and resolving power remained unchanged even though the V groove structure was provided, and the excellent optical characteristics of wax were maintained.

EXAMPLE 3

Screen C of Example 2 was pressed and molded by the same method as used in Example 2 by the use of a female mold which was fabricated to provide a lenticular lens structure of a pitch of 100 $\mu$ and a radius of 110 $\mu$ on one side of the screen, whereby Screen E was obtained.

In Screen E, if the lengthwise direction of the lenticular lens was made vertical, θ ½ in the horizontal direction = 20°, and thus its diffusing characteristic was markedly increased as compared with the θ ½ = 12° of Screen C.

Scintillation and resolving power were free from any appreciable practical changes even though the lenticular lens was provided.

EXAMPLE 4

To 100 parts by weight of molten synthetic wax (oligoethylene wax: melt index of 4 × 10$^3$, viscosity of 4,300 cp at 140° C; softening point of 111° C JISK 2531/'60; penetration of 2 JISK 2530/'60 (at 25° C, 100 g for 5 sec); specific gravity of 0.93 at 20° C JISK 6760/'66) maintained at 160° C there was added 2 parts of Vistanex (polyisobutylene, molecular weight 64,000 – 81,000) previously dissolved in 4 parts of toluene, and then 2 parts of polyethylene of a melt index of 30 (density 0.92 g/cm (JISK 6760 (1971)) was added thereto and mixed therewith. The toluene was then gradually removed by evaporation. This molten mixture was placed in a hopper maintained at 160° C and spread at a thickness of 0.75 mm on a horizontal stainless steel plate in a heating zone which had a surface temperature of 100° C.

After spreading, the horizontal stainles steel plate was moved into a cooling zone and cooled to room temperature at a cooling rate of 20° C/min. Then, after being allowed to stand in a heating zone at 60° C for 10 minutes, the plate was allowed to cool by standing in air, and the wax was taken out as a wax sheet 30 cm squre and 0.75 mm thick. This wax sheet was pressed and molded at 80° C and 15 Kg/cm$^2$ using a female mold to provide a Fresnel lens structure of a pitch of 400 $\mu$ and a focal length of 30 cm on one side of the screen, whereby Screen F with a Fresnel lens structure was produced.

When Screen F was compared with a screen which differed from Screen F only with respect to not having the Fresnel lens structure, it was found that Screen F was uniform in brightness over the entire screen and makedly improved in image reproduction range at the peripherical portions thereof when observed at the least distance of distinct vision.

Furthermore, no change in scintillation and resolving power due to the provision of the Fresnel lens structure was detected.

Combining the above detailed description and Examples, the evaluation of the screens of the present invention as shown in Table 4 was obtained.

Table 4

|  | Screen of the Invention in which a Wax Diffusion Layer is used | Screen of the Invention in which a Crystalline Polymer is used |
|---|---|---|
| Optical Characteristics |  |  |
| Scintillation | ⊙ | ○ |
| Reproduction Range | ⊙ | ○ |

Table 4-continued

| | Screen of the Invention in which a Wax Diffusion Layer is used | Screen of the Invention in which a Crystalline Polymer is used |
|---|---|---|
| Light Redistribution Characteristic | ⊙ | ⊙ |
| Resolving Power | ○ | ○ |
| Stability | ○ | ○ |
| Ease of Production | ○ | △ |
| Cost | ○ | △ |

⊙ means performance is substantially perfect
○ means performance is almost perfect
△ means performance is acceptable for practice According to the present invention, as can be understood from Table 4, wax and crystalline rear projection screens of excellent optical characteristics and stability, etc., can be obtained. Making a comparison between the wax screen and the crystalline polymer screen, it can be understood that the wax rear projection screen is markedly excellent in optical characteristics and is excellent from the viewpoint of all-round performance.

While the invention has been described in detail and with reference to specific embodiments thereof, it will be apparent to one skilled in the art that various changes and modifications can be made therein without departing from the spirit and scope thereof.

What is claimed is:

1. A rear projection screen comprising a diffusion layer containing at least one light scattering material selected from the group consisting of wax and crystalline polymers wherein a micro-optical surface irregularity is provided directly on at least one side of said diffusion layer.

2. The rear projection screen according to claim 1, wherein the wax is selected from the group consisting of natural wax, and petroleum wax.

3. The rear projection screen according to claim 1, wherein the crystalline polymer is selected from the group consisting of polyolefins, polystyrenes, polycarbonates, polyesters, polyamides, polyurethanes, polyvinyl alcohols, esters, and ethers.

4. The rear projection screen according to claim 1, wherein the diffusion layer composed of wax further contains a wax reforming agent.

5. The rear projection screen according to claim 4, wherein the wax reforming agent is selected from the group consisting of natural resins and synthetic resins.

6. The rear projection screen according to claim 4, wherein the wax reforming agent is selected from the group consisting of an ethylene-vinyl acetate copolymer, polyisobutylene, polybutene, rosin, and atactic polypropylene.

7. The rear projection screen according to claim 4, wherein the wax reforming agent is added in an amount of 0.1 to 20% by weight of the total weight of the wax and additives.

8. The rear projection screen according to claim 1, wherein the surface irregularity comprises a micro-optical element structure.

9. The rear projection screen according to claim 8, wherein the size of each micro-optical element as a pitch ranges between about 0.05 and about 2 mm.

10. The rear projection screen according to claim 8, wherein the surface irregularity is a Fresnel lens structure.

11. The rear projection screen according to claim 8, wherein the surface irregularity is a lenticular lens structure.

12. The rear projection screen according to claim 8, wherein the surface irregularity is a V groove structure.

13. The rear projection screen according to claim 1, wherein a Fresnel lens structure is provided on one side of the diffusion layer and a lenticular lens structure is provided on the other side.

14. The rear projection screen according to claim 1, wherein the diffusion layer is bonded to a transparent support.

15. The rear projection screen according to claim 14, wherein the transparent support is an acrylic resin plate.

16. The rear projection screen according to claim 1, wherein the wax is a synthetic wax.

17. The rear projection screen according to claim 16, wherein the molecular weight of the synthetic wax is not more than about 5,000, and the melt index of the synthetic wax is not less than about 1,000.

18. The rear projection screen according to claim 1, wherein the thickness of the diffusion plate ranges between about 0.1 mm and 10 mm.

19. The rear projection screen according to claim 16, wherein the thickness of the diffusion plate ranges between 0.1 mm and 10 mm.

20. The rear projection screen according to claim 8 wherein the surface irregularity consists essentially of a micro-optical element.

21. The rear projection screen according to claim 8 wherein the surface irregularity consists of a micro-optical element.

* * * * *